(No Model.) 2 Sheets—Sheet 1.
H. W. DOVER.
APPARATUS FOR MANUFACTURING CYCLE GEAR CASES.
No. 586,840. Patented July 20, 1897.
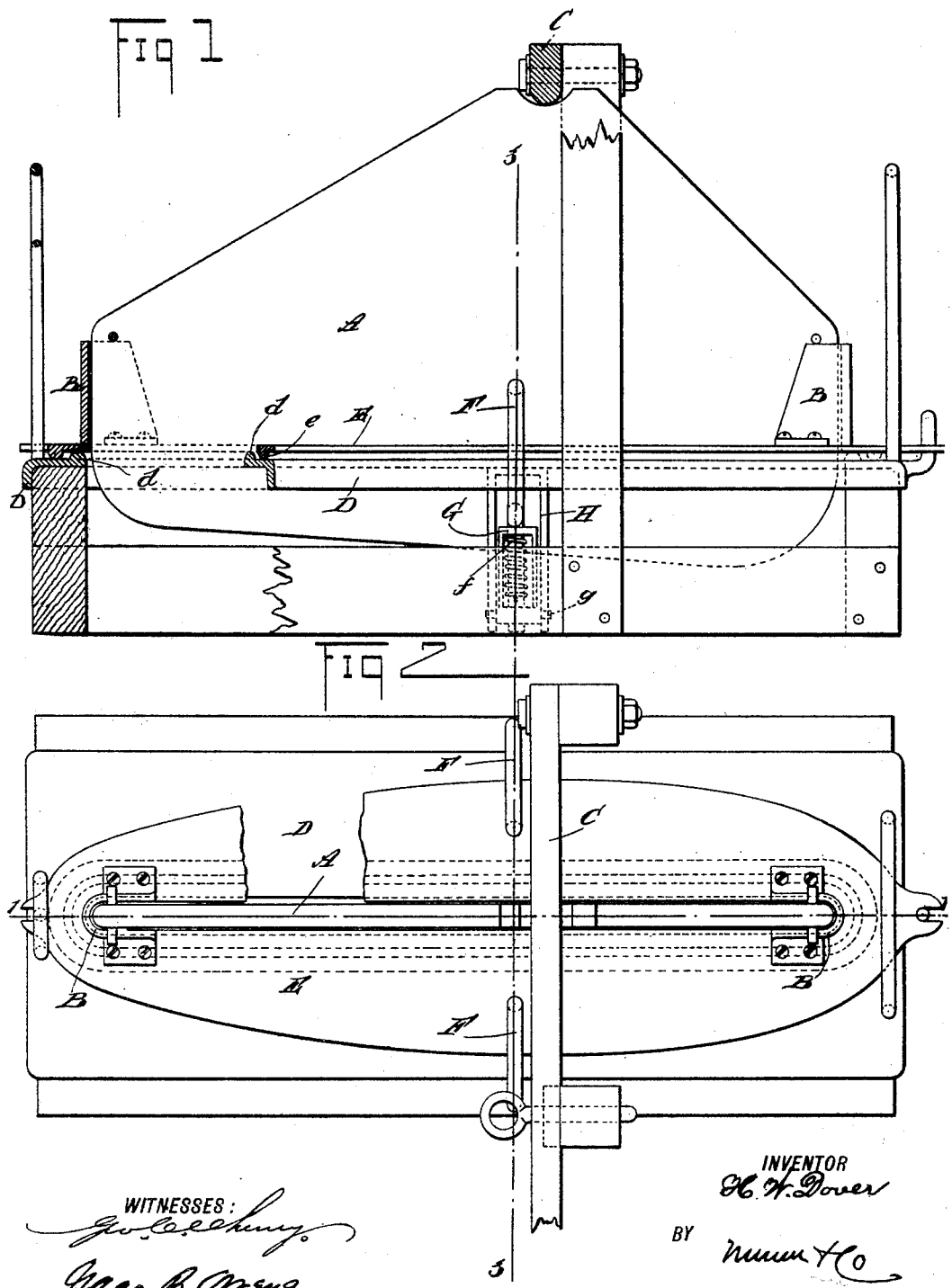
WITNESSES:
INVENTOR
H. W. Dover
BY
Munn & Co
ATTORNEYS.

(No Model.)  2 Sheets—Sheet 2.
H. W. DOVER.
APPARATUS FOR MANUFACTURING CYCLE GEAR CASES.
No. 586,840. Patented July 20, 1897.
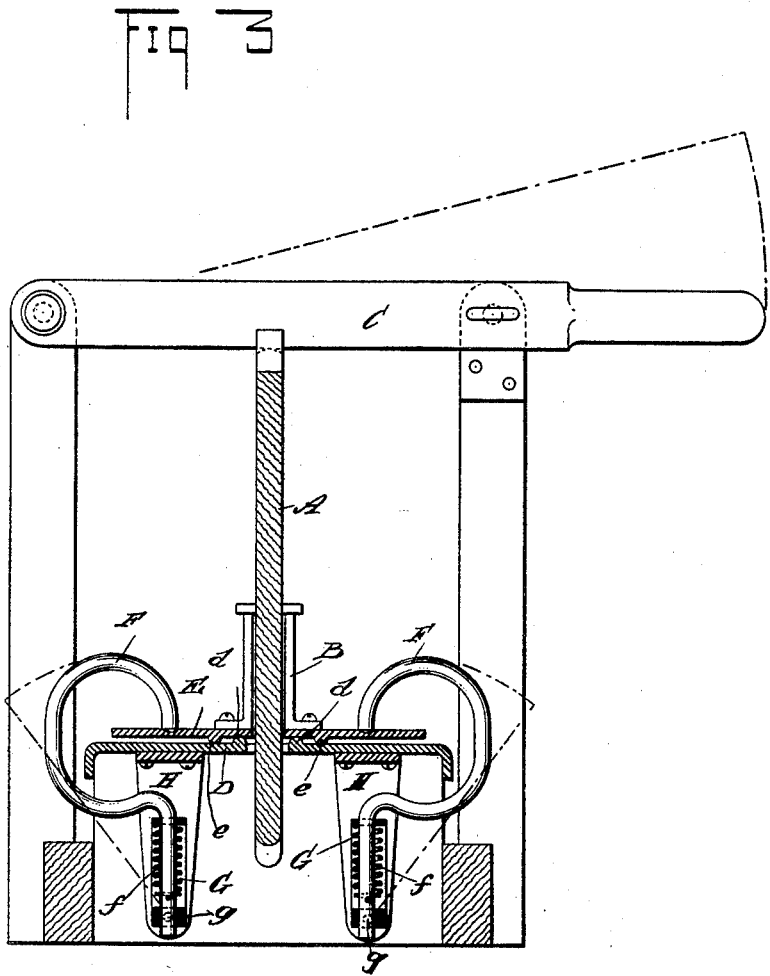
WITNESSES:
INVENTOR
H. W. Dover.
BY
ATTORNEYS.
THE NORRIS PETERS CO., PHOTO-LITHO., WASHINGTON, D. C.

UNITED STATES PATENT OFFICE.

HORACE WALTER DOVER, OF NORTHAMPTON, ENGLAND.

APPARATUS FOR MANUFACTURING CYCLE-GEAR CASES.

SPECIFICATION forming part of Letters Patent No. 586,840, dated July 20, 1897.

Application filed February 2, 1897. Serial No. 621,693. (No model.)

*To all whom it may concern:*

Be it known that I, HORACE WALTER DOVER, engineer, of Mayorhold, Northampton, in the county of Northampton, England, have invented certain new and useful Improvements in Apparatus for Manufacturing Cycle-Gear Cases, of which the following is a full, clear, and exact description.

This invention relates to tools for molding cycle-gear cases of xylonite, (of the kind known as the "Dover" gear-case;) and the invention comprises a preparatory tool for bringing the material in the sheet roughly to shape for the purpose of being brought to its final shape by a finishing-tool such as that forming the subject of another application for Letters Patent of the United States of America, filed the 10th day of November, 1896, Serial No. 611,621.

Reference is to be had to the accompanying drawings, forming part of this specification, wherein—

Figure 1 is a section on the line 1 1 of Fig. 2; Fig. 2, a plan; and Fig. 3, a transverse section on line 3 3, Figs. 1 and 2, of the first or preparatory tool of this invention.

The same letters of reference indicate the same parts in all the figures.

The preparatory tool comprises a plunger or "former" A, preferably made of wood and of a shape conforming roughly to that of the interior of the half-case, the former being suitably guided in uprights B and pressed upon by a hand-lever C. It further comprises an apertured die-plate D or table, upon which the sheet of material is laid in order that it may be forced or drawn by the pressure of the former through the aperture which corresponds in form thereto, with just sufficient clearance to allow for the material. In order to smooth out the wrinkles or puckers that form in the marginal portions of the material in consequence of the drawing of the central portion through the aperture of the die-plate, and so to prevent the puckers of the marginal portion of the sheet extending into the molded article, the aperture in the die-plate is surrounded by a rib $d$ of half-round section on the upper surface of the die-plate, forming a rounded edge over which the material may be drawn easily without tearing, and the sheet of material is pressed between the die-plate or table D and a pressure-plate E, provided with a similarly-shaped rib $e$, opposed in direction to and lying outside of or surrounding the rib $d$ on the die-plate, so that the sheet in yielding to the pressure of the former A, forcing it through the die-plate, will be drawn first under the rib $e$ and then over the rib $d$, whereby the ribs will be caused to act on opposite sides of the sheet in such manner as to gently smooth out and keep back the wrinkles while the material is being drawn between them.

The pressure-plate E is held down upon the sheet by a pair of spring-hooks F, whose shanks are pivoted to turn about their vertical axes in brackets G, which are in turn pivoted on horizontal axes $g$ in brackets H, fixed below the die-plates so that the hooks may be swung aside and turned down out of the way when out of use. Springs $f$ coiled about the shanks of the hooks apply the necessary yielding pressure to the middle of the plate at opposite sides, and in order to distribute this pressure uniformly over the plate E the latter may be slightly cambered in the direction of its length.

The operation of molding is performed by laying the sheet of xylonite cut to a shape conforming approximately to that of the pressure-plate between the die-plate or table and the pressure-plate, applying the spring-pressure hooks and immersing the whole in hot water at the proper temperature to soften the xylonite, and then gently forcing it by the pressure of the lever-operated plungers through the aperture of the die-plate, care being taken to avoid tearing the material by excessive pressure of the plunger, while maintaining sufficient pressure between the table and presser-plate to prevent wrinkles extending into the molded article.

I claim—

1. The combination of a die-plate having an orifice therein, and a rib extending around the orifice, a pressure-plate having one face engaged with the rib of the die-plate and having a rib on said face and projected toward the die-plate, and means movable through the orifice in the die-plate, for drawing a plastic sheet between the pressure and die plates, and molding said sheet, substantially as described.

2. The combination with a frame, of an orificed die-plate, a pressure-plate located above and bearing down on the die-plate, a plunger movable through the orifice in the die-plate, and a spring-pressed hook engaging the pressure-plate and holding the same in position, substantially as described.

3. The combination with a frame, an orificed die-plate carried thereon, and an orificed pressure-plate carried on the die-plate, of a spring-pressed hook carried by the frame and yieldingly holding the pressure-plate in position, and a plunger mounted on the frame and movable through the orifices in the die and pressure plates, substantially as described.

4. The combination with a frame, of a die-plate carried by the frame, a pressure-plate mounted on the die-plate, means coacting with the die and pressure plates to mold a plastic material, a bracket pivotally mounted at each side of the pressure and die plates, and a spring-pressed hook carried in each bracket and yieldingly holding the pressure-plate in position, substantially as described.

5. The combination with a frame carrying a die, of means coacting with the die to mold a plastic material, a pressure-plate bearing down on the die, a bracket pivotally mounted on the frame, and a spring-pressed hook carried in the bracket and engaging the pressure-plate to hold the same in position, substantially as described.

6. In a tool for the preparatory molding of sheet xylonite celluloid or like material roughly to the form of a gear-case, the combination of a male die or plunger, an apertured die-plate and a presser-plate, the adjacent faces of the die-plate and presser-plate being provided with oppositely-projecting ribs surrounding the die-aperture, the rib on one plate surrounding the rib on the other plate so as to act in succession on opposite sides of the material as scrapers extending entirely around the die-aperture whereby to smooth out wrinkles from the material drawn between the die and presser plates.

7. The combination of a die-plate having an orifice therein, and a rib on one face, the rib running around the orifice, a presser-plate bearing on the die-plate and having an orifice registering with the orifice in the die-plate, and also having a rib running around the orifice in the presser-plate and projecting toward that face of the die-plate which face has the first-named rib, the ribs being arranged one outward from the other, and a die movable through the orifices in the die and presser plates, the die and presser plates being capable of holding plastic sheet material between them so that said material may be drawn laterally by the die and the ribs serving to smooth said plastic material as it moves between the die and presser plates.

8. The combination of a die-plate having an orifice therein and having a rib on one face, the rib running around the orifice, a presser-plate bearing on the die-plate and having a rib projecting toward that face of the die-plate which has the first-named rib, the two ribs being located one outward from the other, and a die coacting with the die and capable of drawing plastic sheet material through the orifice in the die-plate, the die and presser plates being capable of holding the plastic material so that the material may be drawn between them, and the ribs serving to smooth the plastic material as it passes between the said die and presser plates.

HORACE WALTER DOVER.

In presence of—
C. G. CLARK,
FRED C. HARRIS.